J. C. JUNKIN.
TAILINGS THRASHER FOR THRASHING MACHINES.
APPLICATION FILED DEC. 7, 1920.

1,406,394.

Patented Feb. 14, 1922.
2 SHEETS—SHEET 1.

Inventor
JOHN C. JUNKIN

By Paul & Paul
HIS ATTORNEYS.

J. C. JUNKIN.
TAILINGS THRASHER FOR THRASHING MACHINES.
APPLICATION FILED DEC. 7, 1920.
1,406,394.
Patented Feb. 14, 1922.
2 SHEETS—SHEET 2.
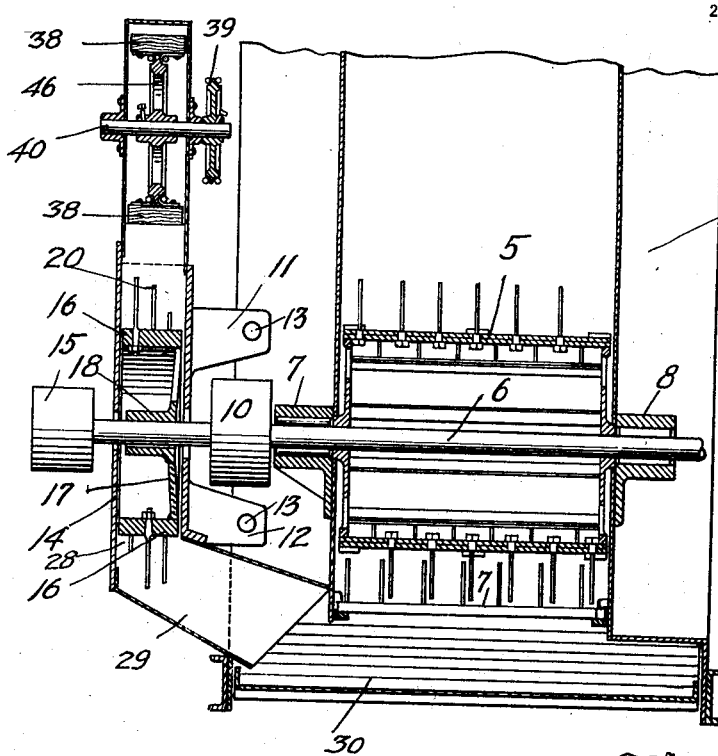
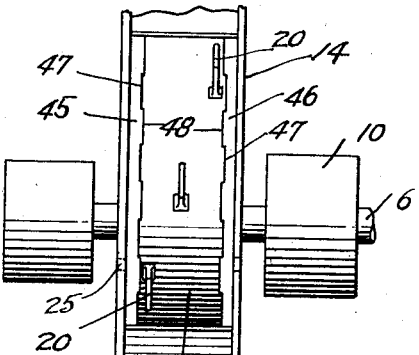
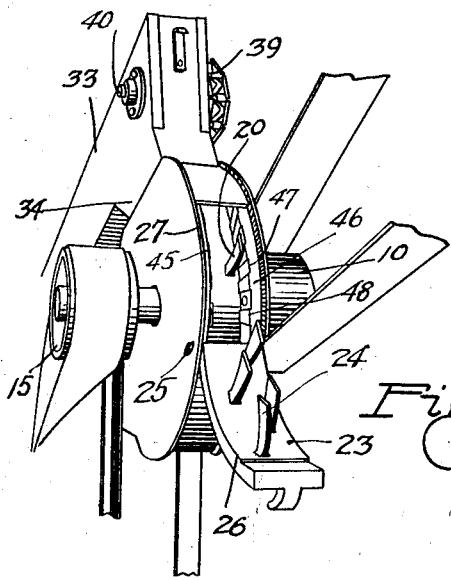
Inventor
JOHN C. JUNKIN
By Paul & Paul
His Attorneys.

UNITED STATES PATENT OFFICE.

JOHN C. JUNKIN, OF MINNEAPOLIS, MINNESOTA, ASSIGNOR TO MINNEAPOLIS STEEL & MACHINERY COMPANY, OF MINNEAPOLIS, MINNESOTA, A CORPORATION OF MINNESOTA.

TAILINGS THRASHER FOR THRASHING MACHINES.

1,406,394.  Specification of Letters Patent.  Patented Feb. 14, 1922.

Application filed December 7, 1920. Serial No. 428,902.

*To all whom it may concern:*

Be it known that I, JOHN C. JUNKIN, a citizen of the United States, resident of Minneapolis, county of Hennepin, State of Minnesota, have invented certain new and useful Improvements in Tailings Thrasher for Thrashing Machines, of which the following is a specification.

My invention relates to improved means for thrashing the material or so-called "tailings" consisting of whole or partially unthrashed grain heads, chaff, and the like, which usually tails over the grain sieves in thrashing machines and is reconducted to the thrashing cylinder of the machine to be thrashed over. It is the common practice to pass such material a second time through the thrashing cylinder and straw racks together with all the fresh straw and grain being fed to the machine and this obviously puts added work on the straw racks and other separating devices and decreases the capacity of the machine.

The object of my invention is to increase the capacity and general efficiency of the machine by avoiding this remixing of the tailings with the main body of the grain and to accomplish this by mounting a short auxiliary thrashing cylinder and concave adjacent the main cylinder, conducting the tailings from the tailings auger to this auxiliary cylinder and passing the thrashed tailings directly onto the grain pan from the auxiliary cylinder.

Another object is to provide a concave in connection with the auxiliary cylinder which will automatically release itself from the cylinder and prevent breakage in case any foreign hard substance should pass through the cylinder.

My invention consists in certain constructions and combinations as will be hereinafter described and particularly pointed out in the claims with reference to the accompanying drawings forming a part of the specification in which, Figure 1 is a side elevation of a thrashing machine having my improvements applied thereto;

Figure 3 is a section taken on the line 3—3 of Figure 2;

Figure 4 is an end elevation of the auxiliary cylinder showing the concave removed;

Figure 5 is a perspective view of the auxiliary cylinder and concave showing the concave in the open or released position;

Figure 1:
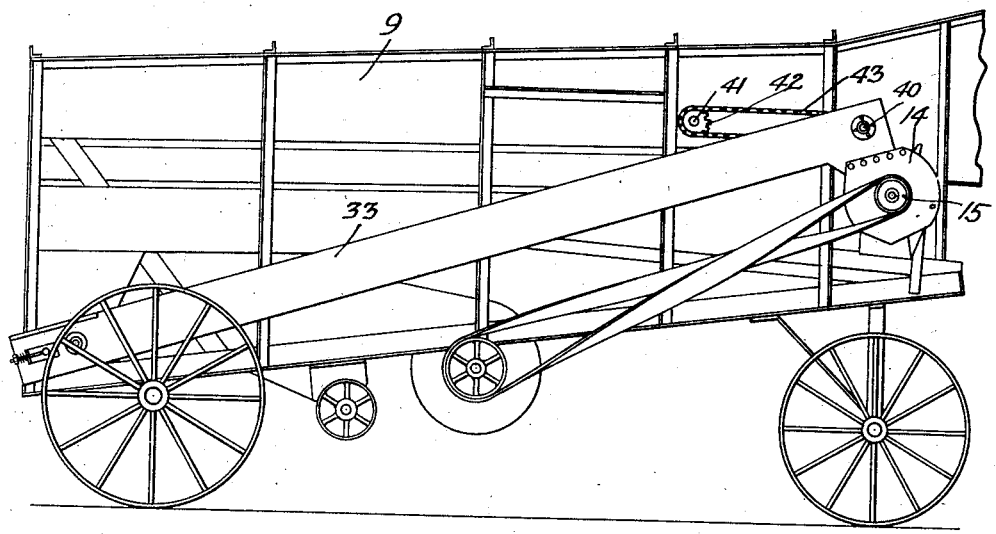

In the drawings, 5 represents the main thrashing cylinder having the shaft 6 mounted upon the usual bearings 7 and 8 upon the frame 9 of the machine and being provided with the usual driving pulley 10. On one side of the machine and fastened to the frame 9 as by brackets 11 and 12 and bolts 13, I arrange a housing 14 through which I extend the cylinder shaft 6 and provide it with the usual pulley 15. Within the housing 14 and upon the shaft 6, I mount the auxiliary cylinder 16 which preferably consists of the spider or web 17 having a hub 18 keyed to the shaft 6 and the cylinder flange 16 in which are secured the thrashing teeth 20 at proper intervals and in staggered relation around its periphery. The teeth 20 have threaded ends and are secured to the cylindrical flange 16 by means of nuts 21 which may be reached through the open end of the cylinder or through openings 22 in the web 17. A concave 23, provided with staggered teeth 24, is hinged to the housing 14 at 25 and its upper weighted portion 26 normally coincides with the annular edges 27 of the side walls of the housing 14. An opening 28 is cut away in the bottom of the housing 14 from which leads an inclined spout 29 to the usual vibrating grain pan 30 of the machine which also receives the grain from the main thrashing cylinder 5 and carries it to the cleaning sieves of the machine indicated at 31 of the drawings. The tailings or overflow from the sieves drops into the tailings auger or conveyors 32, which carry it outside of the machine to the inclined return elevator or conveyor 33 by which it is carried to the auxiliary cylinder housing 14 and discharged through the throat 34 on top of the auxiliary thrashing cylinder 16. The return conveyor 33 preferably comprises an endless chain belt 35 mounted upon sprockets 36 and provided with carrying lugs or slats 38 and driven in the direction of the arrow A in Figure 2 by means of a sprocket wheel 39 upon the shaft 40 carrying the upper conveyor sprocket 36, see Figure 5. The sprocket wheel 39 may be driven from any suitable rotating shaft on the machine but preferably from the raddle shaft 41 provided with a sprocket wheel 42 from which an endless chain 43 runs to the sprocket wheel 39.

Figure 2:
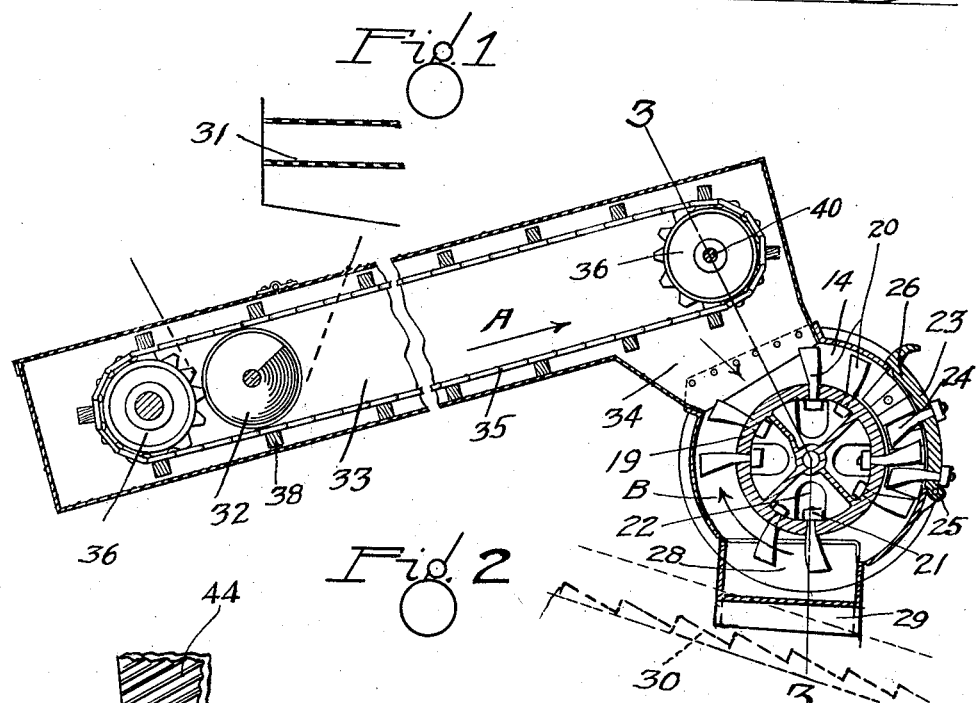
Figure 2 is a sectional view through the auxiliary cylinder and the conveyor leading thereto.
Figure 6:
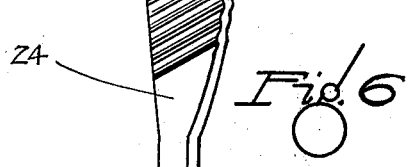
Figure 6 is a modified form of a thrashing tooth.

It will be seen that as the tailings material pass over the cleaning sieves 31, they will be conducted to the auxiliary thrashing cylinder 16 in the manner heretofore described and will be thoroughly rethrashed in passing through the toothed concave 23, the cylinder being driven in the direction of the arrow B in Figure 2 and will then pass in a thrashed condition through the spout 29 directly to the grain pan 30 by which it is conveyed again to the cleaning sieve, thus eliminating a second separation from the straw. It will also be seen that by mounting the auxiliary thrashing cylinder directly on the shaft of the main thrashing cylinder the inertia of the main cylinder will give the auxiliary cylinder a uniform motion and will do away with the use of an extra driving belt. By arranging the return elevator in a low position at only a slight incline, a saving of power and simplicity of construction is obtained and the combined effect will be a considerable increase in capacity and efficiency. It is further obvious, by the position of the concave 23, that if any hard obstructive substance as nuts, bolts, stones or the like should pass into the auxiliary cylinder, the concave 25 will swing outwards to release the obstruction thus preventing injury to the cylinder and concave.

For certain kinds of grain as flax, rice or like tasseled grain, I provide corrugations 44 in the cylinder and concave teeth 20 and 24, and secure segments 45 and 46 having grooves or depressions 47 alternating with high surfaces 48 to the outer annular edges of the housing 14, upon which segments the concave 23 preferably rests. The corrugated sides 44 of the teeth 20 by passing close to the high surfaces 48 alternating with the depressions 47 and the corrugated surfaces of the concave teeth 24, effectually strip and roll the grain heads to release the grain from the heads and this action materially adds to the efficiency of the machine.

I claim as my invention:

1. The combination, with a thrashing machine casing, of a thrashing cylinder mounted therein and a driving shaft on which said cylinder is mounted, said shaft extending outwardly beyond said casing at one side of the machine and having a driving pulley thereon, an auxiliary thrashing cylinder mounted on the extended end of said driving shaft and aided in its revolution by the momentum of said main thrashing cylinder, and means for delivering the repeat material to said auxiliary thrashing cylinder.

2. In a thrashing machine, the combination, with a thrashing cylinder, of a housing encircling said cylinder and having an opening in its peripheral wall and a plate hinged at the lower end of said opening and mounted to swing outwardly to expose said opening and drop by gravity to a point below said opening and allow foreign material, such as stones and the like, to be thrown outwardly through said opening by the revolution of said cylinder.

3. The combination, with a thrashing machine casing, of a thrashing cylinder mounted therein and a driving shaft on which said cylinder is mounted, said shaft extending outwardly at one side of the machine, an auxiliary thrashing cylinder mounted on the extended end of said driving shaft and aided in its revolutions by the momentum of said thrashing cylinder, and means for delivering the repeat material to said auxiliary thrashing cylinder.

4. The combination, with a thrashing machine casing, of a thrashing cylinder mounted therein and a driving shaft on which said cylinder is mounted, said shaft extending outwardly beyond said casing at one side of the machine and having a driving pulley, an auxiliary thrashing cylinder mounted on the extended end of said driving shaft and aided in its revolution by the momentum of said main thrashing cylinder, and means for delivering the repeat material to said auxiliary thrashing cylinder, and said auxiliary thrashing cylinder having means for conducting the grain therefrom to the grain pan of said thrashing machine.

5. The combination, with a thrashing machine casing, of a main thrashing cylinder mounted therein and having its driving shaft projecting outwardly through the wall of said casing at one side of the machine and provided with a driving pulley, an auxiliary thrashing cylinder mounted on the extended end of said driving shaft and aided in its revolution by the momentum of said main thrashing cylinder, a casing enclosing said auxiliary cylinder, a concave mounted in the peripheral wall of said casing and co-operating with said auxiliary cylinder to rethrash the repeat material, an apron mounted to deliver the repeat material to the upper portion of said auxiliary thrashing cylinder casing, and a spout leading from the lower portion of said auxiliary cylinder casing to the thrashing machine grain pan, substantially as described.

6. In a thrashing machine, the combination, with a thrashing cylinder, of a housing encircling said cylinder and having an opening in its peripheral wall, and a toothed concave hinged at the lower end of said opening and mounted to swing outwardly and downwardly to expose said opening and drop by gravity to a point below said opening and allow material, such as stones and the like, to be thrown outwardly through said opening by the revolution of said cylinder.

7. In a thrashing machine, the combination, with a main thrashing cylinder, of an auxiliary thrashing cylinder adjacent thereto, a housing for said auxiliary thrashing cylinder, the peripheral wall of said housing having an opening therein, a toothed concave hinged at one end in said opening and adapted to drop outwardly and downwardly and fully expose said opening and allow foreign material, such as stones, nuts and the like, to be thrown outwardly through said opening by the revolution of said auxiliary cylinder.

In witness whereof, I have hereunto set my hand this 1" day of December, 1920.

JOHN C. JUNKIN.